(12) United States Patent
Gerhard et al.

(10) Patent No.: US 10,279,737 B2
(45) Date of Patent: May 7, 2019

(54) ILLUMINATING DEVICE AND INTERIOR PART FOR A VEHICLE

(71) Applicant: Lisa Draexlmaier GmbH, Vilsbiburg (DE)

(72) Inventors: Matthias Gerhard, Wulfsen (DE); Andreas Kurnoth, Niedererlbach (DE); Lisa Ruhland, Altfaunhofen (DE); Anita Nitzl, Geisenhausen (DE); Markus Wimmer, Mamming (DE); Alexandr Zaviyalov, Landshut (DE); Bernhard Bayersdorfer, Baierbach (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 109 days.

(21) Appl. No.: 15/607,733

(22) Filed: May 30, 2017

(65) Prior Publication Data
US 2017/0341573 A1 Nov. 30, 2017

(30) Foreign Application Priority Data

May 31, 2016 (DE) .................. 10 2016 110 054

(51) Int. Cl.
*F21V 21/00* (2006.01)
*B60Q 3/66* (2017.01)
(Continued)

(52) U.S. Cl.
CPC .................. *B60Q 3/66* (2017.02); *B60Q 3/51* (2017.02); *B60Q 3/745* (2017.02); *B64D 11/00* (2013.01);
(Continued)

(58) Field of Classification Search
CPC ............ B64D 11/00; B64D 2011/0038; B64D 2011/0053; B60Q 3/66; B60Q 3/51; B60Q 3/745
(Continued)

(56) References Cited

U.S. PATENT DOCUMENTS 6,450,678 B1 9/2002 Bayersdorfer
9,175,833 B2 * 11/2015 Young .................... B64D 45/00
(Continued)

FOREIGN PATENT DOCUMENTS

DE 19724486 12/1998
DE 102013202224 8/2014
(Continued)

*Primary Examiner* — Laura K Tso
(74) *Attorney, Agent, or Firm* — Burris Law, PLLC (57) ABSTRACT

An illuminating device for a vehicle includes a carrier module, a flat light guide attached to the carrier module with a plurality of emitting points, and multiple light sources for illuminating the light guide. The flat light guide is concealed with a translucent haptic layer, which is attached to a visible side of the light guide, which, in turn, is covered by a decorative layer. The illuminating device comprises a rope-like light guide, which has an inherent light source and is connected to the decorative layer via a retaining device. This therefore results in a flat arrangement, which can be easily integrated into the interior parts and simultaneously enables illumination over a large surface area. In doing so, additional light effects can be integrated by means of the rope-like light guide. The illuminating device is not visible while switched off, as the illuminating device is covered by the decorative layer.

21 Claims, 5 Drawing Sheets

(51) Int. Cl.
*B60Q 3/51* (2017.01)
*B60Q 3/74* (2017.01)
*B64D 11/00* (2006.01)
*B64D 45/00* (2006.01)

(52) U.S. Cl.
CPC ................. *B64D 2011/0038* (2013.01); *B64D 2011/0053* (2013.01); *B64D 2045/007* (2013.01)

(58) Field of Classification Search
USPC ........ 362/602, 604, 605, 471, 488, 489, 511
See application file for complete search history.

(56) References Cited

U.S. PATENT DOCUMENTS

| | | | |
|---|---|---|---|
| 2013/0063970 A1* | 3/2013 | Oh | ........................ G02B 6/0091 362/604 |
| 2015/0251594 A1 | 9/2015 | Timm et al. | |
| 2017/0090645 A1* | 3/2017 | Shih | ................. B64D 11/00151 |

FOREIGN PATENT DOCUMENTS

| | | |
|---|---|---|
| DE | 102014003527 | 9/2015 |
| FR | 2927859 | 8/2009 |

* cited by examiner

ILLUMINATING DEVICE AND INTERIOR PART FOR A VEHICLE

CROSS-REFERENCE TO RELATED APPLICATIONS

This application claims priority to and the benefit of DE 10 2016 110 054.4 filed on May 31, 2016. The disclosure of the above application is incorporated herein by reference.

FIELD

The present disclosure concerns an illuminating device, and an interior part for a vehicle, which comprises an illuminating device of this type. The illuminating device provides an unobtrusive illumination of vehicles, particularly motor vehicles, aircraft, streetcars, railway cars, and ships, among others.

BACKGROUND

The statements in this section merely provide background information related to the present disclosure and may not constitute prior art.

In aircraft cabins, it is customary to install illuminating elements as separate units, which consist of lamps, decorative elements, and switches. The lamp typically backlights a transparent plate, onto which lettering or characters are attached, such that information is also visible in the dark.

A further option for communicating information is touchscreens that are only illuminated when needed, then displaying the required information.

Furthermore, it is known practice to arrange lights in aircraft such that indirect illumination is created. Surfaces are lit by a concealed light, which illuminates the interior of the aircraft.

DE 10 2014 003 527 A1 describes an aircraft illuminating device with a light distribution body made of flexible plastic, into which light from multiple LEDs is directed, and distributed over the surface. DE 10 2013 202 224 A1 specifies an interior part for an aircraft, which provides for a light guide behind a perforated decorative element, where a spacer is used to adjust the distance between the light guide and the decorative element. DE 197 24 486 A1 and FR 2 927 859 A1 specify interior parts, in which a rope-like (restiform) light guide is inserted into the surface of a decorative element using a textile loop. US 20150251594 A1 describes an illuminating device for an aircraft cover, which provides for multiple additional lighting elements behind a flat, transparent light source.

SUMMARY

There are frequently multiple operating and display elements for various functions at each aircraft seat, which additionally should be illuminated permanently or during certain phases of the flight or trip. As a result, there is more demand for improved illumination solutions, which provide for light sources that can be controlled independently in a common field-of-view, and which can be easily installed on a carrier.

According to the present disclosure, an illuminating device for an aircraft comprises a carrier module, a flat light guide attached to the carrier module with a plurality of emitting points, and multiple light sources for illuminating the light guide. The flat light guide is covered with a translucent haptic layer, which is attached to a visible side of the light guide. The translucent haptic layer in turn is covered by a decorative layer. As an additional illuminating element, the illuminating device comprises a rope-like (restiform) light guide, which has an inherent (separate) light source and is connected to the decorative layer via a retaining device. This results in a flat arrangement, which can be easily integrated into interior parts and simultaneously enables the illumination of large areas. In doing so, additional light effects can be integrated by means of the rope-like light guide. The illuminating device is not visible while switched off, as the illuminating device is covered by the decorative layer.

In this context, a rope-like light guide can be understood as a light guide that is long in length but short in width and height. Here, the rope-like light guide may for example have a round or square cross-section such that the rope-like light guide is in the shape of a bar or a rod, for example. The rope-like light guide may be formed from a highly transparent material such as polycarbonate, but may also function as a diffusing lens in which, for example, scattered particles or light-scattering additives are contained in the rope-like light guides.

An advantageous further form of the present disclosure states that the rope-like light guide is an optical fiber, which is inserted into a sheath. An optical fiber is typically less than 1 mm in diameter, making it difficult to mount. As a result, the optical fiber can be mounted on the retaining device through the proposed sheath. In this case, the sheath may be a flexible textile strip that clings around the optical fiber and closely to it. This results in the optical fiber being reliably attached to the decorative layer. It is advantageous if the optical fiber is attached to the visible side of the decorative layer in such a way that the light in the optical fiber is barely muted/interfered with, or not at all muted, by the decorative layer and/or the retaining device.

It is advantageous if the retaining device is formed by two seams of the decorative layer with which the sheath is sewn. This seam then forms the retaining device. Thus, a decorative element of the decorative layer, i.e. a seam, which extends over the flat light guide, is used to attach the rope-like light guide. The additional illuminating element is thus harmonically integrated into the decorative layer.

The sewing specified above results in seam edges, which extend away from the visible side in the direction of the flat light guide. It is advantageous if these seam edges are kept short. In particular, the seam edges protrude only up to about 3 mm from the decorative layer into the illuminating device. This enables the seam edges to be more easily inserted into the haptic layer.

According to a further advantageous form of the present disclosure, the sheath is a textile that contains plastic, which is placed around the optical fiber and forms a lug protruding from the optical fiber. This lug is used by the retaining device for attachment to the decorative layer, for example by the lug being sewn to the seam edges.

The integration of the seam edges of the decorative layer into the haptic layer is advantageous if the haptic layer is composed of multiple sections, the separating line of which runs along the rope-like light guide. The seam edges are then inserted into the gaps between the sections. In other words, the size and edge routing of the sections of the haptic layer follows the sections of the decorative layer. If the width of the seam edges matches the thickness of the haptic layer, then the gap between the sections can be kept small. This is the case when the thickness of the haptic layer is between 1.5 and 5 mm, or in one form 2 to 4 mm, or in still another form approximately 3 mm. To this end, spacer fabric with transparent threads can be selected for the haptic layer. In this case, a haptic layer has two cover layers, which are connected to one another via pile yarns and create a soft, springy impression on the surface.

It is advantageous if the decorative layer is leather, particularly with a thickness of 0.6 to 1 mm, or in one form 0.7 to 0.9 mm, or in another form 0.8 mm. Real leather, or alternatively artificial leather, gives a particularly appealing impression and, at the thicknesses specified above, enables backlighting, either because the leather is scarfed or skived over the utilized surface of the illuminating device creating a translucent effect, or because the decorative layer is perforated. With these thicknesses, the visibility of the perforation or rather of the light shining through the perforation is only slightly dependent on the viewing position. In order to inhibit the sewing of the decorative layer to the rope-like light guide causing excess stretching of the perforated areas, a distance is retained between the perforation and the retaining device, particularly at least 5 mm, or another form at least 7 mm.

In one form, the perforation is a micro-perforation, which has individual openings. Here, at least isolated openings have a surface area of at least $0.2\ mm^2$ in order to enable the permeation of sufficient quantities of light. The illuminating device is particularly appealing when the size of the openings is varied, particularly when the size decreases from the middle of the illuminating device to the edges. This results in a particularly brightly illuminated central area, which harmoniously transitions into the non-illuminated area of the illuminating device at the edges.

In an advantageous form of the present disclosure, the openings of the perforation are arranged in such a way that the observer is presented with an embellishment. This embellishment may be used for an emergency exit, seatbelt or no-smoking sign, or a company logo. In this case, rather than the openings of the perforation being equally arranged over the area of the embellishment, they form the embellishment.

A laser can be used to make the openings in the decorative layer. Similarly, a laser can be used to generate the emitting points of the surface of the flat light guide. Alternatively or additionally, a reflective layer can be attached to the flat light guide on the side opposite the emitting points in order to increase the light yield of the illuminating device. This is especially advantageous if the light sources shine into a narrow side of the light guide, i.e. the light guide is not backlit, with the light distributed over the area from one or more narrow sides and then emitted to the visible side.

For simple production and good integration of the illuminating device into interior parts, it has proven to be advantageous if the carrier module is formed in a box shape, i.e. comprises a base plate with side panels. The light sources, for example LEDs, can then be integrated into the side panels. The light sources are attached onto the carrier modules by means of press fitting, for example.

A light transmission element can be arranged between the rope-like light guide and the light source provided for the rope-like light guide. The light transmission element is light-conducting and may be produced, for example, from a transparent plastic such as polycarbonate. To this end, the light transmission element can be used to reliably transmit light from the light source to the rod-shaped light guide. The light transmission element is in one form shaped as a rod and/or bar and runs parallel to the rope-like light guide. If a light transmission element is used, it may be advantageous if light-scattering additives are used in the rope-like light guide to better homogenize the light directed in the rope-like light guide. The light source provided for the rope-like light guide is in one form arranged for light conduction on a front edge of the light transmission element, whereby a longitudinal side of the light transmission element is adjacent to the rope-like light guide for light conduction.

The flat light guide may have at least one throughput through which the rope-like light guide is routed. The throughput is in one form oblong. In this case, the throughput, and in one form the longest side of the throughput, runs parallel to a longitudinal side of the flat light guide. In another form, multiple throughputs are placed parallel to one another in the flat light guide. In one form, the rope-like light guide is inserted into the throughput and protrudes through the flat light guide. Furthermore, the carrier module may also have a throughput, with the result that the rope-like light guide is routed through both the flat light guide and the carrier module. If there are multiple throughputs in the flat light guide, it is advantageous if one rope-like light guide is provided per throughput. The rope-like light guide is in one form square, particularly a bar shape.

It may furthermore be advantageous if multiple separate light sources are arranged on the rope-like light guide. In this manner, it is possible, for example, to create chase lighting and/or to illuminate various areas of the rope-like light guide differently.

In this context, it may be advantageous if the light sources provided for the rope-like light guide are arranged in a row. The role of light sources may be represented, for example, by a line of dot-like light sources. These may be monochrome or multi-colored light sources. It is advantageous if all light sources that are arranged in a row are arranged along an area of the rope-like light guide. In this context, the rope-like light guide in one form runs parallel to the row of light sources.

The carrier module may have recesses through which the rope-like light guide is at least partially routed. The rope-like light guide can either be routed through the recess next to the flat light guide or, alternatively, it is also possible for the flat light guide to have throughputs that are arranged congruently with the recesses in such a that way the rope-like light guide is routed through the recess in the carrier module as well as through the throughput in the flat light guide.

The inventive interior part for a vehicle is based on the aforementioned illuminating device and additionally comprises a slot on a side panel, which opens a mounting space of the interior part, into which the illuminating device can be inserted and in which the illuminating device can be attached. This type of attachment means is such that the illuminating device can be easily removed, and maintained or replaced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 shows an illuminating device according to the present disclosure, switched on;

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The illuminating device described in the following is intended for integration into an interior part and only to be visible when switched on, i.e. if the illuminating device is switched off, then only one surface of the illuminating device, which does not differ from the surface of the adjacent areas of the interior part, remains visible to the observer.

Figure 1:
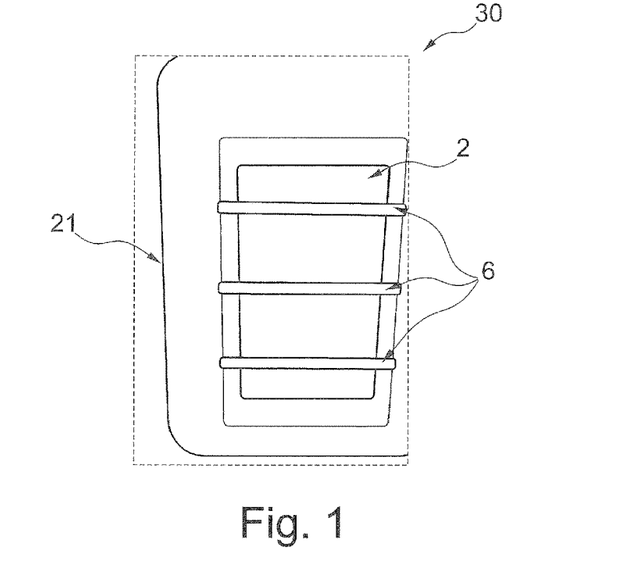

The interior part (30) shown in FIG. 1 is, for example, a backrest of a group of seats for the passenger cabin of an aircraft in the VIP (Very Important Person) area. An illuminating device comprising a flat light guide (2), which has, for example, a surface area of 300×500 mm, and three rope-like light guides (6) arranged parallel to one another and with spacing, is integrated into the interior part (30). Larger illuminating devices are also conceivable. The illuminating device connects to a side panel (21) of the interior part (30). The flat and rope-like light guides (2, 6) have different luminosities, with the result that there is a visible distinction between the brightness of each. This results in an optically appealing structure, in which the rope-like light guide (6) also continues beyond the flat light guide (2) onto the surface of the interior part (30).

Figure 2:
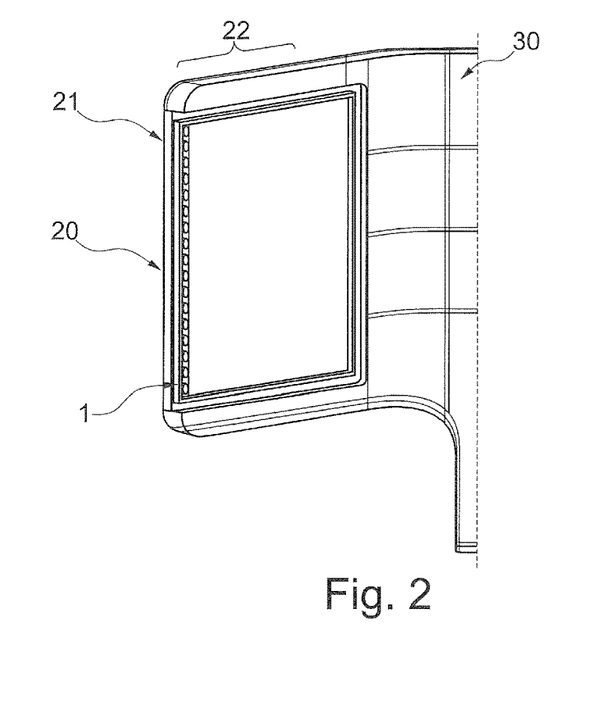
FIG. 2 shows an interior part with the illuminating device installed.

FIG. 2 shows the interior part (30) in a top view, in which cover layers of the interior part have been omitted for purposes of clarity. The illuminating device is arranged on the side panel (21) of the interior part (30), because this provides the option of inserting the illuminating device through a slot (20) in the side panel (21). According to the dimensions of a carrier module (1) for the illuminating device, the interior part (30) provides for a mounting space (22), i.e. a hollow cavity, into which the carrier module (1) can be inserted and attached. A side panel of the carrier module (1) seals the illuminating device against being seen opposite the slot (20).

Figure 3:
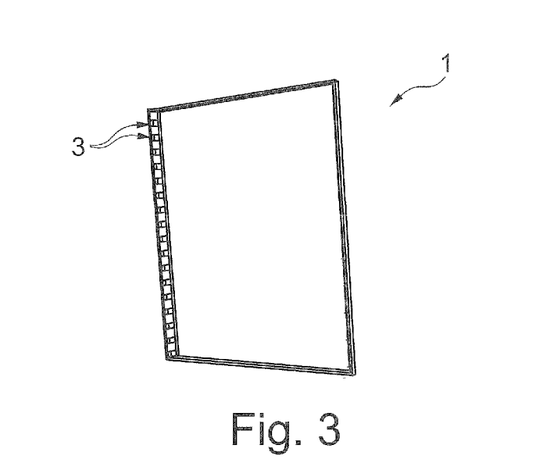
FIG. 3 shows a carrier module with LEDs.

The carrier module (1) in one form is produced from plastic using the laser sintering method (SLS, Selective Laser Sintering) and contains openings on a side panel for light sources (3). This can be more easily seen in FIG. 3. The light sources (3) are multicolored LEDs, which are connected to the carrier module (1) by means of press fit into the openings. As the surface of the carrier module (1) increases, more or stronger LEDs (3) should be used. Alternatively or additionally, LEDs can also be attached on the opposite side panel or a reflective film can be attached there. This will increase the luminosity of a flat illumination.

Figure 4:
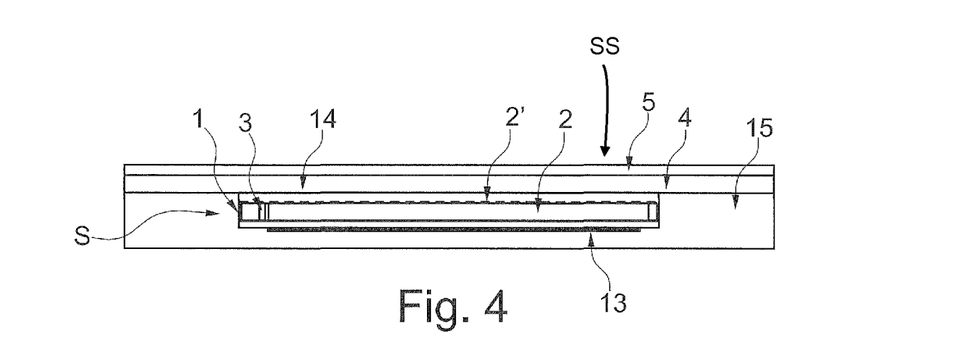
FIGS. 4 and 5 show sectional views of the illuminating devices from the X and Y directions.

FIG. 4 shows the illuminating device in a sectional view through the side panel of the carrier module (1) with the LEDs (3). The illuminating device is surrounded by a structure (15), which is part of the interior part and leaves free the intended mounting space (22) (see FIG. 2). The carrier module (1) is placed flush in this mounting space (22), and a reflector film (13) is placed on the base (turned away from the visible side (SS)) of said carrier module.

The flat light guide (2) is furthermore attached in the carrier module (1), with a small amount of play on both sides. This space is used on one side to attach the LEDs (3) which then laterally provide light from a narrow side (S) of the light guide (2) into it. The light of the LEDs (3) in the light guide (2) diffuses due to reflections on the short ends of the light guide (2). On the underside, any exiting light is cast back into the light guide (2) by the reflective film (13). Toward the visible side (SS), emitting points (2') placed at the surface of the light guide (2) provide that light is emitted homogeneously through the use of lasers.

The flat surface is raised at these emitting points (2'). The otherwise prevailing dominant refractive index differences between PMMA (which is used for the flat light guide (2) and is polymethyl methacrylate or acrylic/acrylic glass) and the surrounding air, lead to reflection back into the light guide (2) with the flat surface. However, at the uneven emitting points, this results in enhanced emission of light beams. The emitting points (2') are distributed over the surface of the flat light guide (2) such that light is emitted evenly over the entire surface of the illuminating device, although the available quantity of light in the light guide (2) from the LEDs (3) to the opposite side panel is constantly decreasing.

A protective layer (14) is attached over the light guide (2) and to the structure (15) and subsequently arranged flush with it with respect to the visible side SS. Said protective layer (14) made of transparent PMMA is used to separate the flat light guide (2) in the carrier module (1) mechanically from the cover layers (4, 5) described in the following. This means the protective layer (14) and the light guide (2) underneath are not bonded together but rather are detachable from one another.

Both a haptic layer (4), formed here by a 3-mm thick spacer fabric made of transparent fibers of two cover layers, which are connected to one another with pile yarn, as well as a decorative layer (5) made of approximately 0.8-mm thick split and shrink-optimized real leather, extend over the surface of the illuminating device as well as over the adjacent surfaces of the interior part. This causes the illuminating device not to be visible when switched off.

Figure 5:
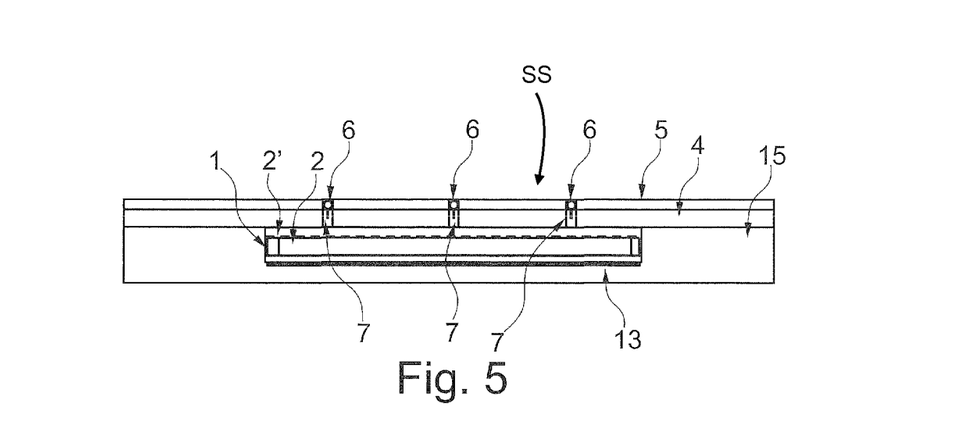

The representation of the illuminating device according to FIG. 5 has a different intersecting line, selected in this case to be vertical with respect to that according to FIG. 4. With the same layer structure as in FIG. 4, the LEDs are not visible. To achieve this, the haptic layer (4) and the decorative layer (5) are subdivided into multiple sections—in this case five—which are arranged parallel to one another and aligned with respect to the abutting edges. This results in gaps which are used to place a rope-like light guide (6), between the sections of the haptic layer (4). Light is fed into the rope-like light guide (6) by means of inherent light sources, which are LEDs (not shown here), at the ends thereof. Three parallel rope-like light guides (5), optical fibers (LWL) here, are arranged precisely at a seam point between the sections of the decorative layer (5). As shown later in FIG. 6, the seam edges and a lug of a sheath surrounding the optical fiber (LWL) extend away from the visible side (SS) into the illuminating device.

Figure 6:
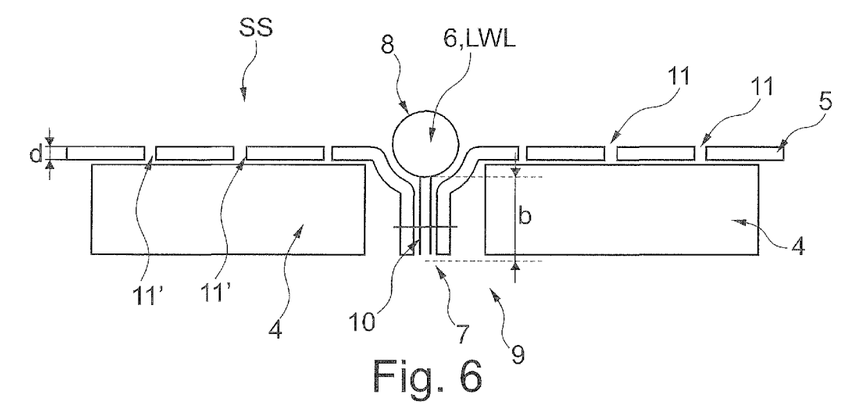
FIG. 6 shows a haptic and decorative layer with the rope-like light guide attached.

FIG. 6 shows a seam point of the cover layers (4, 5) enlarged. The optical fiber (LWL) is surrounded by a sheath (8) made of flexible textile with a plastic portion, in which ends of the sheath (8) form a lug (10), which extends parallel to the optical fiber (LWL) and are bonded together by heating both portions of the lug (10). Thus, the optical fiber (LWL) fits tightly in the sheath (8).

The optical fiber (LWL) is arranged in the center in the gap between two sections of the spacer fabric (4). The real leather is connected to the spacer fabric (4) by means of a bonded connection, as a decorative layer (5). The decorative layer (5) is perforated in advance by means of a laser, in such a way that the perforation (11) then comprises openings (11'). The openings (11') are between 0.5 and 2 mm wide, whereby the opening (11') next to the optical fiber (LWL) is at a distance of 7 mm from it. The thickness (d) of the decorative layer (5) is 0.8 mm. Ends of the sections of the decorative layer (5) on the optical fiber (LWL) form seam edges 9, which connect to the optical fiber (LWL) and enclose the lug (10) of the sheath (8). This makes it possible to sew together the lug (10) and the seam edges (9). The seam edges (9) in this case are approximately 3 mm wide, and can therefore be stowed in the gap between the sections of the haptic layer (4). This sewing forms the retaining device (7) for the optical fiber (LWL) on the decorative layer (5).

Figure 7:
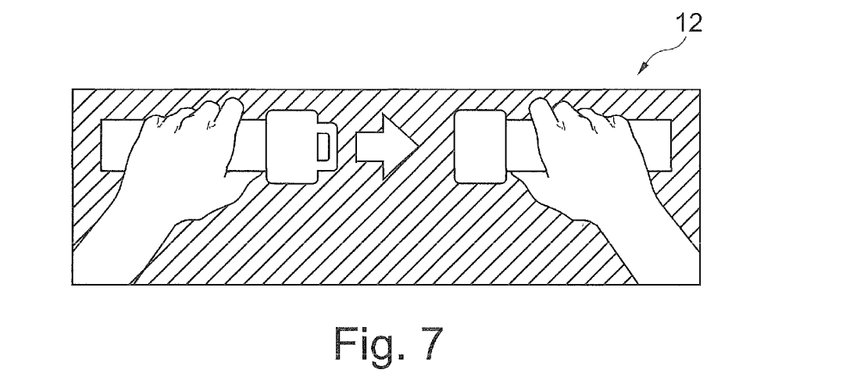
FIG. 7 shows an illuminating device as an embellishment.

Finally, FIG. 7 shows an example of an embellishment (12), which can be created by means of the illuminating device through backlighting. A seatbelt sign is made visible by the openings (11') of the perforation (11) being arranged only at the locations in the decorative layer (5) that are required for expressing the shape of the embellishment (12).

Figure 8:
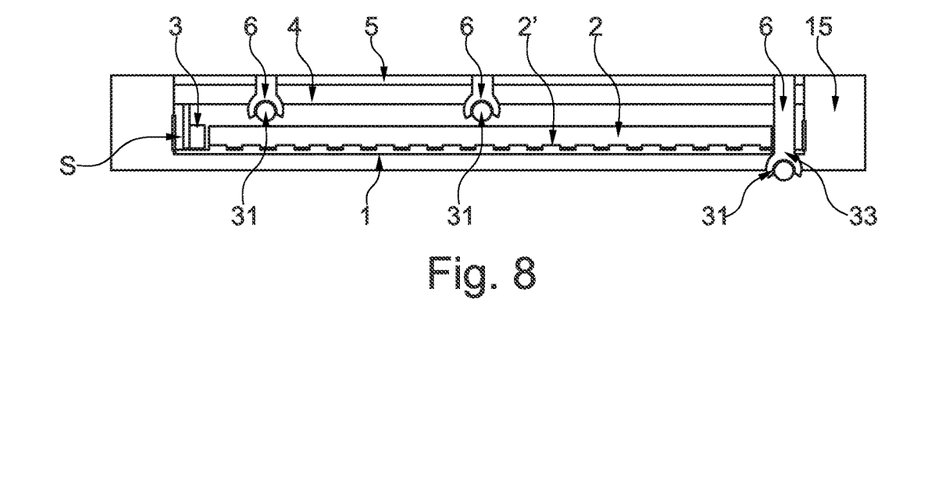
FIG. 8 shows an alternative form of the illuminating device in a sectional view.

FIG. 8 shows an alternative form of the illuminating device in a sectional view. In this case, the light is transmitted by the light source (6') (not shown) provided for the rope-like light guide (6) by means of an additional light transmission element (31). The light transmission element (31) extends parallel to the rope-like light guide (6), whereby the light source (6') (not shown) provided for the rope-like light guide (6) is arranged on a front (not shown) of the light transmission element (31). The light transmission element (31) is formed in the example embodiment at hand by a highly transparent rod-shaped light guide made of polymethyl methacrylate (PMMA). The light of the light source (6') is evenly fed into the rope-like light guide (6) by the light transmission element (31) in such a way that an even and homogeneous light pattern is created. Two rope-like light guides (6) and/or light transmission elements (31) are arranged above the flat light guide (2). A third rope-like light guide (6) is arranged next to the flat light guide (2), whereby the rope-like light guide (6) protrudes through a recess (33) in the carrier module (1). Furthermore, the scattered particles (2') are arranged on a side of the flat light guide (2) facing away from the haptic layer (4) and/or the decorative layer (5).

Figure 9:
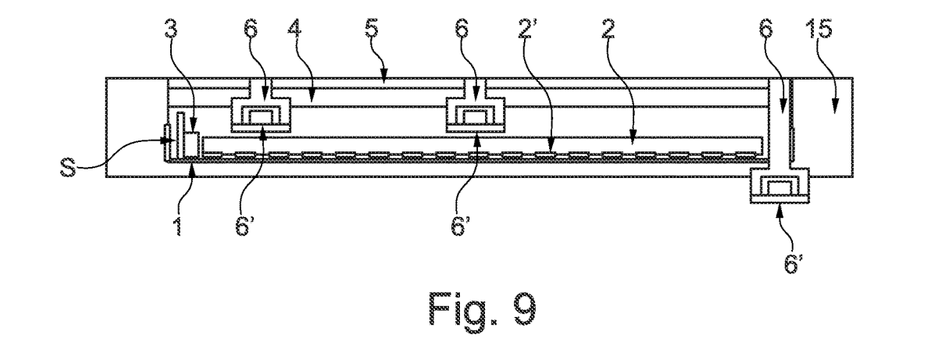
FIG. 9 shows a further alternative form of the illuminating device in a sectional view.

FIG. 9 shows a further alternative form of the illuminating device, in which the form according to FIG. 9 differs from the form according to FIG. 8 in that, instead of light transmission elements, a row of light sources (6') is arranged directly on the rope-like light guide (6). The row of light sources (6') in the present example form is created by multiple dot-like multicolored LEDs. The light sources (6') are directly attached to the rope-like light guide (6) using a non-adhesive.

Figure 10:
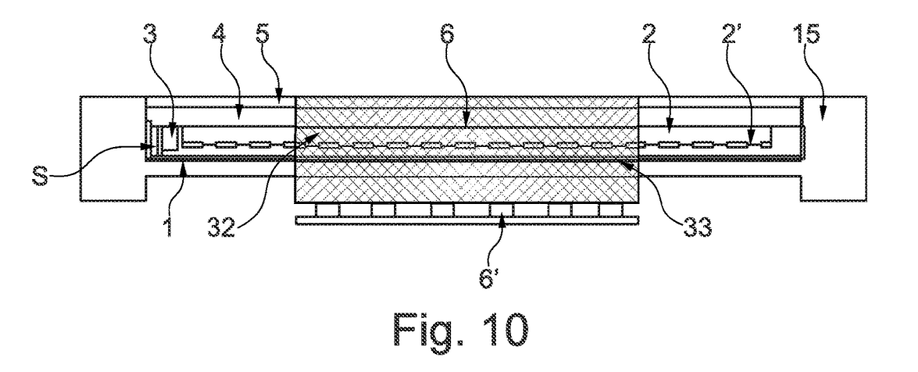
FIG. 10 shows a further alternative form of the illuminating device in a sectional view.

FIG. 10 shows a further alternative form of the illuminating device, in which a throughput (32) is placed in the light guide (2) and a recess (33) is placed in the carrier module (1). Due to the throughput (32) and the recess (33), the rope-like light guide (6) is arranged in the form of a light strip. A row of dot-like light sources is arranged along the rope-like light guide (6).

Figure 11:
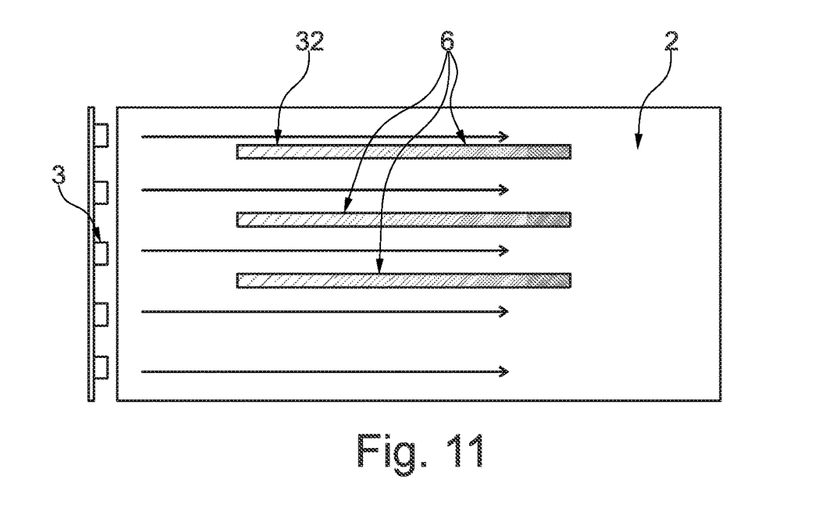
FIG. 11 shows a top view of the illuminating device according to FIG. 10.

FIG. 11 shows a top view of the flat light guide according to the form illustrated in FIG. 10. Three throughputs (32) have been placed in the flat light guide (2); a rope-like light guide (6) is placed in each of these throughputs. The rope-like light guides (6)/the throughputs (32) are arranged parallel to one another. The light sources (3) of the flat light guide (2) are arranged on the narrow side (S) of the flat light guide (3). The longitudinal side of the throughputs (32)/rope-like light guides (6) are essentially arranged vertically to the narrow side of the flat light guide (2). Because the rope-like light guide (5) is backlit by several light sources arranged in a row, various colors and brightnesses can be represented simultaneously in various areas of the rope-like light guide (6).

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An illuminating device for a vehicle comprising:
a carrier module;
a flat light guide having a plurality of emitting points, the flat light guide being attached to the carrier module;
multiple light sources for illuminating the flat light guide;
a translucent haptic layer is attached to a visible side of the flat light guide;
a decorative layer connected to the haptic layer; and
a rope-like light guide having a light source,
wherein a retaining device for the rope-like light guide is provided on the decorative layer.

2. The illuminating device according to claim 1, wherein the rope-like light guide is an optical fiber inserted into a sheath, wherein the sheath is attached to the retaining device.

3. The illuminating device according to claim 2, wherein the retaining device is formed from two seam edges of the decorative layer and the sheath is sewn to the seam edges.

4. The illuminating device according to claim 3, wherein the seam edges have a width of approximately 3 mm.

5. The illuminating device according to claim 2, wherein the sheath is a textile that contains plastic and is placed around the optical fiber to form a lug protruding from the optical fiber, is the lug being used by the retaining device for attachment.

6. The illuminating device according to claim 1, wherein the translucent haptic layer is composed of several sections, a separating line of which runs along the rope-like light guide.

7. The illuminating device according to claim 1, wherein the translucent haptic layer is a spacer fabric with transparent threads, wherein the thickness of the threads is between 1.5 and 5 mm.

8. The illuminating device according to claim 1, wherein the decorative layer is leather having a thickness between 0.6 and 1 mm.

9. The illuminating device according to claim 1, wherein the decorative layer defines a perforation, wherein the perforation starts at a distance from the retaining device of at least 5 mm.

10. The illuminating device according to claim 9, wherein the perforation of the decorative layer has individual openings having a surface area of at least 0.2 mm$^2$.

11. The illuminating device according to claim 10, wherein the size of the openings is varied and decreases from a center of the illuminating device to edges of the illuminating device.

12. The illuminating device according to any of claim 9, wherein the perforation is arranged such that an embellishment defines a sign.

13. The illuminating device according to claim 1, wherein the emitting points are created in a surface of the flat light guide and a reflective layer is attached to the flat light guide on a side opposite the emitting points.

14. The illuminating device according to claim 1, wherein the multiple light sources beam into a narrow side of the flat light guide.

15. The illuminating device according to claim 1, wherein the carrier module is formed in a shape of a box and the multiple light sources are attached to the carrier module by means of press fitting.

16. The illuminating device claim 1, wherein a light transmission element is arranged between the rope-like light guide and the light of the rope-like light guide.

17. The illuminating device according to claim 1, wherein the flat light guide has at least one throughput through which the rope-like light guide is routed.

18. The illuminating device according to claim 1, wherein multiple light sources are arranged on the rope-like light guide.

19. The illuminating device according to claim 18, wherein the multiple light sources are arranged in a row.

20. The illuminating device according to claim 1, wherein the carrier module has at least one recess through which the rope-like light guide is at least partially routed.

21. An interior part for a vehicle having a slot on a side panel, which opens a mounting space of the interior part, into which the illuminating device of claim 1 is inserted and attached.

\* \* \* \* \*